United States Patent Office 3,830,819
Patented Aug. 20, 1974

3,830,819
MANUFACTURE OF l-DIHYDROCODEINE
Edward Leon Grew and David Jackson Powles, Edinburgh, Scotland, assignors to MacFarlan Smith Limited, Edinburgh, Scotland
No Drawing. Filed Feb. 22, 1972, Ser. No. 228,367
Claims priority, application Great Britain, Feb. 22, 1971, 5,081/71
Int. Cl. C07d 43/28
U.S. Cl. 260—285   3 Claims

ABSTRACT OF THE DISCLOSURE

A process for the preparation of a purified l-dihydrocodeine which comprises the steps of:
(a) catalytically hydrogenating l-dihydrocodeinone in a liquid medium using a catalyst selected from the group consisting of platinum oxide and supported platinum metal to produce a solution of crude l-dihydrocodeine,
(b) removing the catalyst from the solution, and
(c) treating the solution for recovery of a purified l-dihydrocodeine having a reduced content of l-dihydrothebainone and/or l-dihydrothebainol.

This invention relates to an improved process for the manufacture of l-dihydrocodeine (l=laevorotary) and to the purification thereof.

l-Dihydrocodeine is an important analgesic which is used extensively in the relief of pain. It is normally manufactured by the catalytic hydrogenation of codeine, which is an alkaloid obtained from the opium poppy.

l-Dihydrocodeine may also be prepared by the catalytic hydrogenation of l-dihydrocodeinone, which in turn may be obtained from thebaine.

In U.S. Application No. 204,298 of one of us and Alastir A. Robertson filed 2nd December 1971 and entitled Reduction of Thebaine there is disclosed a method for the conversion of thebaine into dihydrothebaine, which may be hydrolysed to l-dihydrocodeinone. Thebaine is also an alkaloid obtained from the opium poppy. However it finds considerably less commercial utility than codeine and hence is economically more attractive for use in the manufacture of l-dihydrocodeine.

It is an object of the present invention to provide an improved process for the preparation of l-dihydrocodeinone from l-dihydrocodeine which is commercially attractive because it is based on thebaine rather than codeine as starting material for the synthesis. It is also an object of the invention to provide a process for the purification of l-dihydrocodeine by reducing the content of l-dihydrothebainone and/or l-dihydrothebainol which we have found may be associated with the synthesis.

We have found that l-dihydrocodeinone may be readily converted to l-dihydrocodeine by hydrogenation in a liquid medium (as hereinafter defined) using a supported platinum metal or a platinum oxide catalyst, and further that the resulting l-dihydrocodeine is contaminated with small amounts of l-dihydrothebainone and l-dihydrothebainol. These impurities are, like morphine, phenols and have been found to give a positive reaction in the test in the 1968 British Pharmacopoeia (1969 addendum) and similar official specifications for the presence of morphine in l-dihydrocodeine tartrate, in spite of the absence of morphine itself as an impurity. As a result, dihydrocodeine tartrate prepared by the catalytic hydrogenation of l-dihydrocodeinone may fail to comply with the specification of the British and other pharmacopoeias. We have found that such contaminants can be removed either by alkaline extraction or by an ion exchange process and that following such treatment the product obtained complies with the official specifications.

The invention provides a process for the purification of l-dihydrocodeine containing as impurities l-dihydrothebainone and or l-dihydrothebainol, which comprises treating the impure l-dihydrocodeine to remove said impurities therefrom by either extraction with an aqueous alkali or by passage of the material through an anion exchange resin of a quaternary ammonium type in the hydroxide form whereby the proportion of said impurities is reduced.

The crude l-dihydrocodeine may be one prepared by the catalytic hydrogenation of l-dihydrocodeinone and according to a feature of the invention, there is therefore provided a process for the preparation of a purified l-dihydrocodeine which comprises the steps of (a) catalytically hydrogenating l-dihydrocodeinone in a liquid medium using a platinum oxide or supported platinum metal catalyst to produce a solution of crude l-dihydrocodeine,
(b) removing the catalyst from the solution, and
(c) treating the solution for the recovery of a purified l-dihydrocodeine having a reduced content of l-dihydrothebainone and/or l-dihydrothebainol. The purified l-dihydrocodeine may be recovered in salt form, if desired.

The solution in step (c) may be treated by isolating the crude l-dihydrocodeine therefrom, dissolving the crude l-dihydrocodeine in a water-immiscible solvent and extracting the solution with an aqueous alkali.

The solution in step (c) may alternatively be passed through an anion exchange resin of a quaternary ammonium type in the hydroxide form.

By the term "liquid medium" as used herein, we mean a liquid in which l-dihydrocodeinone has an appreciable solubility. Typical of such liquid media are the lower alkanols (having from one to five carbon atoms per molecule) and, in particular, ethyl alcohol, especially in its commercially available form of industrial methylated spirit. In the latter case it is convenient to employ a suspension of the l-dihydrocodeinone in the solvent whereby the alkaloid dissolves as the hydrogenation proceeds.

The catalytic hydrogenation may be carried out at ambient or higher temperatures and at atmospheric or greater than atmospheric pressure of hydrogen.

In carrying out the alkaline extraction method of purification according to the invention, l-dihydrocodeine is isolated from solution by well known techniques, for example evaporation under low pressure, and dissolved in a water-immiscible solvent, for example a liquid aromatic hydrocarbon such as benzene. The solution is then extracted at least once with aqueous alkali, which is preferably an aqueous solution of an alkali metal hydroxide, such as sodium hydroxide. Following the alkali extraction process, the organic solvent is removed, for example by evaporation under reduced pressure, and if recovery of the purified l-dihydrocodeine is required in salt form, a water-miscible solvent such as ethyl alcohol or acetone and an acid, such as tartaric acid, are added.

In the other method of purification, the solution of crude dihydrocodeine obtained after completion of the hydrogenation and removal of the catalyst is passed through a column of the hydroxide form of a quaternary ammonium type anion exchange resin. A satisfactorily purified product may be obtained after a single passage of the solution through the column. However, several passages may be effected if desired. The purified l-dihydrocodeine may be recovered or converted to the salt form by usual techniques.

The l-dihydrocodeine prepared or purified by the processes of the invention can be converted to l-dihydrocodeine tartrate which complies with the specification of the 1968 British Pharmacopoeia (1969 Addendum) for l- dihydrocodeine tartrate, in particular with regard to the figure for the morphine test which is below the maximum allowed.

The following Examples illustrate the invention:

EXAMPLE 1

48.0 g. of l-dihydrocodeinone, 1.2 g. of platinum oxide and 400 ml. of 95% industrial methylated spirit were placed in a 1 litre glass flask provided with a sealed stirrer, glass baffle and gas inlet tube. The air in the flask was replaced by hydrogen and the mixture vigorously stirred at room temperature under hydrogen at atmospheric pressure. After a short induction period, rapid uptake of hydrogen commenced and was complete after about 5-6 hours. After removal of the catalyst by filtration, the solution was analysed by gas-liquid chromatography and the reaction product found to consist of 97.4% l-dihydrocodeine, 1.6% l-dihydrothebainol, 0.5% l-dihydrothebainone and 0.5% l-dihydrocodeinone.

The solution was divided into three equal portions A, B and C which were treated separately as described below.

(A) The solution was concentrated under reduced pressure to about 100 ml. final volume and treated, with stirring, with rather more than one molar ratio of tartaric acid referred to the total weight of alkaloid present in the solution. After cooling to room-temperature the dihydrocodeine tartrate was filtered off, washed with spirit and dried. Yield 22.2 g. (92% theory). The product complied with the requirements of the 1968 B.P. (1969 Addendum) specification for dihydrocodeine tartrate in all respects, with the exception of the test for morphine, the material giving a colour value (extinction at 510 mµ) of 0.84 compared with the maximum permissible figure of 0.16 represented by the value for the standard morphine solution.

(B) The solution was evaporated to dryness under reduced pressure and the residue of crude dihydrocodeine dissolved in 25 ml. of benzene. The benzene solution was then extracted four times with 25 ml. portions of 2N aqueous caustic soda solution and once with 25 ml. of water. The benzene was then removed under reduced pressure and the residue redissolved in 100 ml. of 95% industrial methylated spirit. Treatment of the solution with tartaric acid as in A gave 20.4 g. (84.5% theory) of dihydrocodeine tartrate. The product complied with the B.P. specification in all respects, the colour value in the morphine test being 0.11 compared with the limit of 0.16.

(C) The solution was passed through a 1 inch diameter x 12 inches high column of Deacidite FF quaternary ammonium type anion exchange resin in the hydroxide form over the course of about two hours. The resin column was then washed with 200 ml. of 95% industrial methylated spirit and the effluent solution and washings combined and evaporated under reduced pressure to about 100 ml. of final volume. Treatment of the solution with tartaric acid as in A gave 21.8 g. (90.3% theory) of dihydrocodeine tartrate which complied with the requirements of the 1968 B.P. specification in all respects. The colour value in the morphine test was 0.02 compared with the limit of 0.16 showing that the impurities responsible for producing the colour reaction in the B.P. test are more efficiently removed by resin treatment than by caustic extraction as in B.

EXAMPLE 2

96 g. of l-dihydrocodeinone suspended in 400 ml. of 95% industrial methylated spirit was hydrogenated at atmospheric pressure with 2.4 g. of platinum oxide catalyst as described in Example 1. After removal of the catalyst the solution was divided into four equal portions, dihydrocodeine being isolated as the tartrate from one such portion without further treatment and from the remaining three portions after treatment on different grades of Deacidite FF resin in the hydroxide form. The colour values in the morphine test of the four samples of dihydrocodeine tartrate obtained are shown in the table below:

| Sample No. | Resin used for treating solution of crude dihydrocodeine | Colour values of dihydrocodeine tartrate in B.P. morphine test (limit 0.16) |
|---|---|---|
| 1 | None | 0.41 |
| 2 | Grade SRA 69 (7-9% crosslinking) | 0.018 |
| 3 | Grade SRA 65 (3-5% crosslinking) | 0.012 |
| 4 | Grade SRA 61 (2-3% crosslinking) | 0.010 |

EXAMPLE 3

12 g. of l-dihydrocodeinone suspended in 400 ml. of 95% industrial methylated spirit was hydrogenated at atmospheric pressure with 0.3 g. of platinum oxide catalyst as described in Example 1. After removal of the catalyst, dihydrocodeine tartrate was isolated from one-half of the solution without resin treatment and from the other half after treatment on a column of Deacidite FF resin, grade SRA 69, in the hydroxide form. The colour values in the B.P. morphine test of the untreated and resin treated samples were 0.72 and 0.02 respectively.

EXAMPLE 4

6 g. of dihydrocodeinone was stirred with 50 ml. of 95% industrial methylated spirit and 0.15 g. of platinum oxide catalyst at room temperature under hydrogen at 30 lbs. per sq. inch pressure until absorption of the gas was complete. After removal of the catalyst the whole of the solution was passed through a column of 50 g. of Deacidite FF resin, grade SRA 69, in the hydroxide form. The effluent solution and washings were concentrated under reduced pressure and treated with tartaric acid to yield 8.3 g. (91.7% theory) of dihydrocodeine tartrate giving a colour value in the B.P. morphine test of 0.02.

EXAMPLE 5

6 g. of dihydrocodeinone was hydrogenated at 30 lbs. per sq. inch hydrogen pressure as in Example 4 using 1.0 g. of 10% platinum metal supported on barium sulphate as catalyst in place of the platinum oxide. The solution, after completion of the hydrogenation and removal of the catalyst, was treated with resin as in Example 4 followed by isolation of the dihydrocodeine as the tartrate. Yield 8.23 g. Colour value in the B.P. morphine test 0.02.

What is claimed is:

1. In a process for the preparation of a l-dihydrocodeine where l-dihydrocodeinone is catalytically hydrogenated in a liquid medium with a catalyst selected from the group consisting of platinum oxide and supported platinum metal to produce a solution of l-dihydrocodeine containing as an impurity l-dihydrothebainone or l-dihydrothebainol, or mixtures thereof, the improvement which comprises the steps of:

(a) removing the catalyst from the solution after hydrogenation;
(b) passing the solution of l-dihydrocodeine containing as an impurity l-dihydrothebainone or l-dihydrothebainol, or mixtures thereof, through a quaternary ammonium anion exchange resin in hydroxide form and
(c) recovering the l-dihydrocodeine.

2. A process for the purification of l-dihydrocodeine containing as an impurity l-dihydrothebainone or l-dihydrothebainol, or mixtures thereof, which comprises treating the impure l-dihydrocodeine to remove said impurity therefrom by passage of the material through a quaternary ammonium anion exchange resin in hydroxide form, whereby the proportion of said impurities is reduced.

3. A process as claimed in claim 1 in which the catalyst is removed by filtration.

(References on following page)

References Cited

UNITED STATES PATENTS 3,257,406 6/1966 Sawa _____ 260—285
3,221,008 11/1965 Wolf _____ 260—285

FOREIGN PATENTS 7,787 4/1966 Japan _____ 260—285
10,366 5/1967 Japan _____ 260—285

DONALD G. DAUS, Primary Examiner